United States Patent
Reghetti

(10) Patent No.: US 7,096,163 B2
(45) Date of Patent: Aug. 22, 2006

(54) VOICE ACTIVATED COMMANDS IN A BUILDING CONSTRUCTION DRAWING SYSTEM

(76) Inventor: Joseph P. Reghetti, 5185 Turnberry La., Las Vegas, NV (US) 89113

( * ) Notice: Subject to any disclaimer, the term of this patent is extended or adjusted under 35 U.S.C. 154(b) by 744 days.

(21) Appl. No.: 10/081,669

(22) Filed: Feb. 22, 2002

(65) Prior Publication Data
US 2003/0167155 A1    Sep. 4, 2003

(51) Int. Cl.
*G06F 17/50* (2006.01)
*G11B 27/00* (2006.01)

(52) U.S. Cl. ............... 703/1; 703/6; 715/728
(58) Field of Classification Search .............. 703/1, 703/6; 715/728
See application file for complete search history.

(56) References Cited

U.S. PATENT DOCUMENTS

| 4,811,243 A | * | 3/1989 | Racine ............... 715/863 |
| 5,227,983 A | | 7/1993 | Cox et al. |
| 5,557,537 A | | 9/1996 | Normann et al. |
| 5,808,905 A | * | 9/1998 | Normann et al. ............ 703/2 |
| 6,567,772 B1 | * | 5/2003 | Hoeft ........................... 703/1 |

* cited by examiner

*Primary Examiner*—Hugh Jones
(74) *Attorney, Agent, or Firm*—Bell, Boyd & Lloyd LLC

(57) ABSTRACT

A building construction drawing system incorporates a voice activated command recognition and actuation module to enable a building construction system designer, such as a fire sprinkler system designer, to be able to draw building construction systems, or components thereof, using simple and easy to remember voice commands. This building construction drawing system is easier and faster for the designer to learn and to use effectively because the designer does not need to know or learn how to find the command he or she wants using a traditional mouse or keyboard input device, which can be cumbersome and slow.

49 Claims, 4 Drawing Sheets

VOICE ACTIVATED COMMANDS IN A BUILDING CONSTRUCTION DRAWING SYSTEM

FIELD OF TECHNOLOGY

This disclosure relates to building construction drawing systems and, more particularly, to a building construction drawing system, such as a fire sprinkler drawing system, that enables a user to create building construction system drawings in an electronic environment using voice activated commands.

RELATED ART

Fire sprinkler systems are commonplace and are typically used in commercial buildings of all types. Fire sprinkler systems, which are usually placed into buildings during the construction of those buildings, include numerous sprinkler heads typically disposed at or below the ceiling of each floor of a building, with each of the sprinkler heads being connected by supply pipes to a water source within the building. The sprinkler heads usually include some heat detector, such as a heat sensitive material, which, when the temperature at the head becomes great enough, causes the sprinkler head to spray water over a certain area covered by the sprinkler head. Of course, there are many different kinds of fire sprinkler systems and the type and design of a fire sprinkler system to be used in any building is generally based on a number of factors, such as the use of the building, what is stored in the building, etc. In most cases, the design and construction of fire sprinkler systems within a building is heavily regulated by one or more applicable building standards or codes. In most cases, a city, county, town, state, or other government organization promulgates one or more building codes to be used to determine the construction and design requirements of a fire sprinkler system to make sure these systems are adequate to assure safety in the event of a fire.

In the past, fire sprinkler designers, familiar with the applicable building standards or codes, designed a fire sprinkler system for a particular building using a blueprint or layout drawing of the building. During this process, the designer selected the fire sprinkler system components to used and designed the fire sprinkler system layout based on the locations of the walls, the ceilings, and other building elements, based on the use to which the building was to be put, the materials within the building and a host of other relevant factors, as defined by the relevant building standard or standards. This process was time consuming as it was manual in nature. In fact, the designer, after or during the process of mentally designing a fire sprinkler system, drew the fire sprinkler system by hand using manual drawing tools, such as straight edges, compasses, templates, etc.

However, as commercial and municipal building construction increased, especially during the building boom in the 1980s and 1990s, more and more building regulations began to appear related to the construction of fire sprinkler systems. Because of the increase in construction and the increase in the number and complexity of building standards, the need for qualified fire sprinkler system designers became acute. In fact, the backlog in work caused by the insufficient quantity of qualified fire sprinkler system designers has frequently slowed down building construction projects.

To overcome the problem of too few qualified sprinkler designers, there has been an attempt to produce a fire sprinkler system design program that electronically designs a fire sprinkler system automatically with little or no input from a designer. This fire sprinkler design program is described in U.S. Pat. Nos. 5,227,983, 5,557,537 and 5,808,905 which describe a program executed on a computer that stores the requirements of numerous building standards related to fire sprinkler design and uses these building standards to automatically create a fire sprinkler layout. The program allows a user to input a drawing of the building for which a fire sprinkler system is to be designed and allows a user to select the appropriate building standard for the design. The program then uses the selected building standard to automatically design a fire sprinkler system for the building. This program is designed to eliminate the need for qualified fire sprinkler system designers by enabling anyone to design a fire sprinkler system with the program. However, this program is very cumbersome and is not commercially feasible because it would require frequent updates to be able to store all of the building standards that could be used, as well as to change the building standards stored therein when these building standard are changed by the standards bodies, which is frequent. Because there are hundreds and even thousands of applicable building standards, the updating process alone makes the program unusable. As far as the inventor knows, this automatic design program has never been commercialized.

However, other fire sprinkler design systems, based on known or standard computer-aided-drafting (CAD) platforms do exist. One such popular which has been sold and used around the world to aid designers in drawing fire sprinkler systems is sold under the tradename of AutoSPRINK, by M.E.P.CAD, Inc., headquartered in Las Vegas, Nev. This program uses an object oriented programming protocol to enable an experienced fire sprinkler system designer to draw the fire sprinkler system that the designer is creating. The user interface of this program is in a standard windows environment including many windows-type commands that allow a designer to place or draw a building and its components, such as walls, ceilings, floors, electrical fixtures, plumbing fixtures, etc. on a screen or display and to then design a fire sprinkler system for that building. During this process, the designer is able to use many different windows-type commands to enable the user to place fire sprinkler system elements, such a pipes, sprinkler heads, water mains, couplings, etc. within the building in the process of drawing the fire sprinkler system being designed. In this program, the user must use a mouse or a keyboard to select one of numerous windows-type pop-up menus or pull down menus to perform one of many different commands or actions. Because of the complexity of the drawing process, and the specialized knowledge that a fire sprinkler system designer must have to be able to design a fire sprinkler system, as well as all of the specialized parts and components of a fire sprinkler system, this drawing program has many thousands of commands that the designer must learn to use to be able to use the fire sprinkler drawing system effectively.

Thus, it takes a good deal of training or experience on the fire sprinkler system drawing program itself before a fire sprinkler system designer can become truly competent and effective at drawing the fire sprinkler systems he or she is designing. Unfortunately, because of the high demand for fire sprinkler system designers, these designers typically do not have the time to devote to learning to use the fire sprinkler drawing program effectively. In fact, because of the great number of specialized and complex commands and functions that can be performed by the fire sprinkler drawing system, the testing and design aids available as part of the system, and the different parts of the fire sprinkler system components and building components that can be used, the use of this fire sprinkler drawing system can be somewhat overwhelming to the designer. Thus, while a designer may know what he or she wants to draw, or what action he or she wants the program to take, this designer may not be able to remember how to find, using the mouse and the keyboard, the appropriate command within the host of commands available in the drawing program. As a result, the designer is typically very inefficient when using the program until the designer has become very familiar with the programming structure and commands.

SUMMARY

A building construction drawing program, such as fire sprinkler system drawing program, incorporates a voice activated command recognition and actuation module to enable a system designer to be able to draw a building or mechanical system, or components thereof, using simple and easy to remember voice commands. This system is easier and faster for the designer to learn and to use effectively because the designer does not need to know or learn how to find the command he or she wants to initiate using a mouse or keyboard, which can be cumbersome and slow. This system enables a building construction system designer, such as a fire sprinkler system designer, to learn how to draw the system in an electronic format more effectively and faster, which further enables a designer to perform more work in the same amount of time.

DETAILED DESCRIPTION

Figure 1:
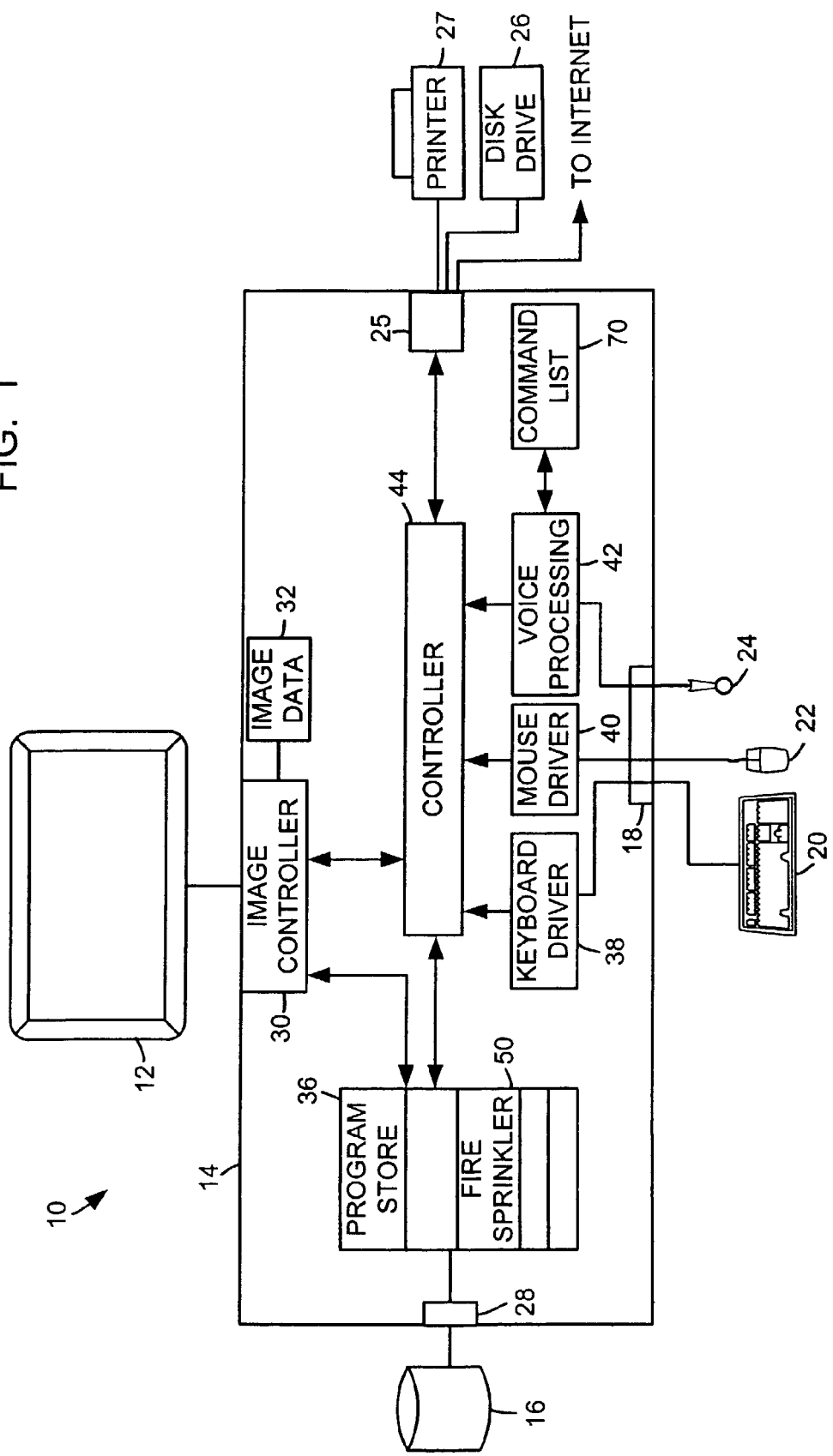
FIG. 1 is a block diagram of a fire sprinkler drawing system having voice activated command capabilities.

Referring to FIG. 1, a computer based fire sprinkler drawing system 10 having integrated voice activated command features is illustrated in block diagram form. It should be noted that, while the fire sprinkler drawing system 10 is described herein as being implemented in software executed on a personal computer, this system could be executed on any other type of computer as well, such as in any laptop computer, handheld computer or data assistant, any larger mainframe type computer, etc. Still further, the fire sprinkler drawing system 10 described herein could be implemented in firmware or hardware elements such as in application specific integrated circuits (ASICs) as well as in typical software routines. It will also be understood that, as described herein, the different modules, routines or programs stored in a computer memory may be stored in any desired manner in volatile memory, such as in a magnetic type memory, random access memory, etc., as well as in any desired type of non-volatile memory such as in EPROMs, EEPROMs, ASICs, etc. Still further, these routines may be embodied in hardware logic circuits (which are considered to be memories) of any desired types, such as ASICs. Moreover, while the description herein specifically describes the use of voice activated commands in a fire sprinkler drawing system, this same concept could be embodied in any building construction drawing system implemented on a computer, including, for example, in plumbing drawing systems, electrical drawing systems, architectural drawing systems, gas delivery drawing systems, etc. In those cases, the drawing program could be tailored to the specific type of system being drawn, each of which is generally a building construction system, such as a distribution system.

As illustrated in FIG. 1, the fire sprinkler drawing system 10 includes a display device 12, such as an LCD screen, CRT screen, plasma panel display, printer or other type of display, a processing unit 14 and a database 16. The system 10 may also include user input ports 18 which may include standard or known inputs for a keyboard 20, a mouse device 22. and a microphone 24 or other voice input device. If desired, the system 10 may also include one or more input/output ports 25 that enable files, such as drawing files or other types of data to be delivered to the processing unit 14 from, for example, a CD or floppy disk drive 26, the internet, etc. Further, a printer 27 may be connected to the fire sprinkler drawing system via one of the input/output ports 25 and any other external communication port may be included and used to enable the system 10 to print out or to download reports or other data generated by the system 10.

The database or memory storage unit 16 may be a RAM on a hard drive or any other type of memory and is connected to the processing unit 14 via any appropriate input/output (I/O) driver or device 28. Furthermore, the database 16 may include different storage regions for pipes, fittings and other sprinkler system elements available to be used to draw a fire sprinkler system, for building elements available to be used to draw a building, and for the building and sprinkler systems currently being drawn, etc. The memory 16 may be organized in any desired manner and may be accessed using any suitable database access software.

A number of different programs or routines may be stored in and executed on the processing unit 14 which, of course, includes a memory and a typical processor such as a general purpose processor of any desired type. As illustrated in FIG. 1, the processing unit 14 may store and execute a number of modules or routines which are used to provide user input/output functions as well as to implement or provide assistance in drawing a fire sprinkler system for a building. In particular, the processing unit 14 may implement a graphics or image display controller 30 which may store, in an image data memory 32, data associated with the image being displayed on the display device 12 and may process or manipulate that data as needed. While the image data memory 32 will generally be RAM or a buffer memory that is easily accessible, the image data memory 32 may be within the hard drive of the computer or may be any other suitable memory. The image or display controller 30 may be implemented using any desired or known image or display control software or routine, such as that associated with the MICROSOFT Windows operating system.

The processing unit 14 also includes a program store 36 which stores the programs or routines (or the portions thereof currently being used) and which are executing within the processor. The program store 36 stores or implements the programs needed to perform the numerous tasks associated with the fire sprinkler drawing program that will be described in more detail herein. The processing unit 14 also includes a number of input drivers, such as any standard keyboard input unit 38 and mouse input unit 40 which process the keyboard and mouse generated commands. Such input drivers may be those as provided by the MICROSOFT Windows operating system. Still further, and importantly, the processing unit 14 stores and executes a voice processing module or routine 42. The voice processing unit 42 which, preferably, is a voice recognition unit, may be implemented using, for example, the MICROSOFT speech API program. However, this voice processing unit 42 may be any other desired type of voice processor. The processing unit 14 also includes an arbiter or controller 44 that controls the order of and the timing of the execution of the different programs or modules within the processing unit 14. Thus, the controller 44 arbitrates the timing and execution of the different programs, routines or modules such as the programs within the program store 36, the input drivers 38, 40 and 42, the image controller 30, etc. to assure that these programs interact together in a seamless manner.

In one embodiment, a fire sprinkler drawing program 50 is stored in the program store 36. This fire sprinkler system drawing program 50 may be, for example, based on the AuotSPRINK program described above. In any event, the fire sprinkler drawing system routine 50 may be implemented in a CAD programing structure developed using an object oriented programming paradigm. In this situation, the logical concept for describing components of the computer program are known as objects. An object is used to define the properties and interfaces of a system component. The computer program is an assembly of one or more objects and this object structure helps to clearly define and encapsulate the components of the computer program. The program uses "Object Oriented Programming," an industry standard practice, well known in the art, for program definition, design, and development. In one embodiment, the objects are implemented in C++ program code as classes. A class is a C++ programming language data structure that exists to implement the logical concept of an object and is used to encapsulate the data properties and methods/interfaces of an object into a single data structure.

Generally speaking, three basic foundation structure programs are initially stored into the computer memory 16 or the processing unit 14 to implement the fire sprinkler system objects for display in a fire sprinkler system drawing produced on the display device 12. First, Microsoft Foundation Program Structure is a program based upon the Microsoft standard Multi-Document Interface (MDI). This program model is built upon a base including four fundamental objects, namely, Application, Frame, Document, and View. The Application, sold under the trademark, MICROSOFT FOUNDATION CLASS LIBRARIES (MFC), provides utilitarian objects and represents a program itself. It is through the Application object that the process is initiated and all other objects come into existence. The Application creates the Frame, Document, and View objects. The Frame object represents the frame window of the Application that becomes visible to the user and acts as the manager for subsequent user interface objects, such as other windows. The Frame object encapsulates the internal data structures used by the operating system, sold under the trademark MICROSOFT WINDOWS, to create and maintain an application's parent window. The Document object represents an instance of the user's data and is stored to memory for later retrieval. Many Document objects can exist for each instance of the program, enabling the program to open several documents simultaneously. The View object represents a view into the data of a Document object. The View object provides the user with a visual interface to the Document. The View object encapsulates the internal data structures used by the MICROSOFT WINDOWS operating system to create and maintain an application's child window. Many View objects can exist for each Document object, enabling the program to display several different views of the same document simultaneously.

The second foundation program within the routine 50 is a CAD foundation program sold under the trademark SYMMETRICA, for the piping system design software. This software includes a set of programming objects that expands upon the MFC program structure. It adds capability to the MFC Application, Frame, Document, and View objects, enabling them to offer the fundamental behavior and interfaces of a CAD program. Many essential objects provided by this program support the needs of a CAD program. An Application object necessary to support the CAD program, and a Frame object which establishes the parent window framework required to support the CAD program objects are derived from MICROSOFT MFC Objects. A Document object is used to provide all the capability required to encapsulate CAD drawing data, which includes drawing elements and user settings appropriate to each drawing. A View object provides a visual interface to the document object. This View object provides the three dimensional view, rotation and scaling properties, enabling the user to view the document's data from any arbitrary three dimensional position, view rotation, and magnification. It also provides for requesting three dimensional Cartesian coordinate (x, y, z) point input from the user. Input is provided by the system pointing device 22 (mouse), the keyboard 20, or both. Also provided is a base class object of all CAD drawing elements, such as lines, arcs, circles, etc., that can be managed by the Document object and displayed by the View object. This object defines the interface to the CAD drawing elements that all derived classes inherit through standard C++ mechanisms. This standard interface enables the definition of the new kinds of elements for the CAD drawing, such as a pipe layout object derived from a line segment. The CAD foundation program further acts as the foundation program for other programs.

The third foundation program is the program sold under the trademark OBJECT DBX. This program is a collection of objects for reading, writing, and viewing DWG and DXF drawing files. This file format is well known in the art, the industry standard for the exchange of drawing files, and is used in one embodiment of the fire sprinkler drawing system described herein. Using OBJECT DBX objects, the above CAD foundation has the capability to read, write, and view DWG and DXF drawing files. This capability is implemented in the CAD program Document and View objects. DWG and DXF drawing files can be read/appended to a CAD drawing and the CAD drawings may be stored on a data storage medium as DWG and DXF drawing files. Additionally, DWG and DXF drawing files can be selected as a backdrop to the current CAD drawing. This method enables the CAD program to make full use of the high-speed display objects to view DWG and DXF drawings. When the display must be refreshed, the background drawing is displayed first, immediately followed by the elements of the CAD drawing.

In general, the CAD program stores fire sprinkler system elements, such as pipes, sprinkler heads, hangers, fittings, couplings, etc., as well as building elements, such a walls, ceilings, floors, beams, electrical components, plumbing components, etc. as templates or generic objects in one or more parts databases in, for example, the memory 16. The CAD program may also store information describing features and capabilities of the drawing routine in the form of a Help database, in the memory 16.

During operation, the CAD program enables the user to perform any of numerous commands to create or produce a building and/or a fire sprinkler system drawing having a plurality of fire sprinkler system elements connected together at particular locations in the drawing using the parts and elements in the parts databases. In the past, these commands were generated solely using mouse and keyboard inputs and the design or function of these commands is known in the art. During operation, and in response to the user initiated commands, the CAD program produces the fire sprinkler system drawing essentially as a set of interconnected objects each having particular properties (as specified by the user initiated commands), such as location, size, color, etc. that define these objects and the interconnection of these objects. The CAD program stores the fire sprinkler system drawing, which may include fire sprinkler system elements with or without building elements therein, in the memory 16 or other memory associated with the system 10. The CAD program, using the image controller 30 and other programs described herein, also displays the fire sprinkler system drawing, or portions thereof, on the display unit 12.

In some cases, the CAD program may enable a user to perform other functions or analyses on or with respect to the fire sprinkler system drawing, such as performing any desired or known hydraulic calculations or analysis on the drawing. Such hydraulic calculations may include finding a remote area in the drawing, as that term is generally known in the art, and performing hydraulic calculations using that remote area to understand or view the flow capabilities or properties of the fire sprinkler system which has been drawn. Such hydraulic calculations are known and need not be described herein. The CAD program may also implement a system optimizer that enables the user to change elements within the drawing and to determine the hydraulic effects of that change to thereby optimize the fire sprinkler system in terms of function and cost. Still further, the CAD program may implement a report that lists all of the parts in the fire sprinkler system or a selected portion of the fire sprinkler system, or any other desired report. Of course, the functionality of the fire sprinkler system drawing routine itself is not new and, thus, will not be described in detail herein. Also, while the fire sprinkler drawing routine is described herein as being an object-oriented routine, it could be any other type of routine, using other programming structures or paradigms, that provides a user with the capability to produce a fire sprinkler system drawing on a display device using a set of user initiated commands.

Figure 2:
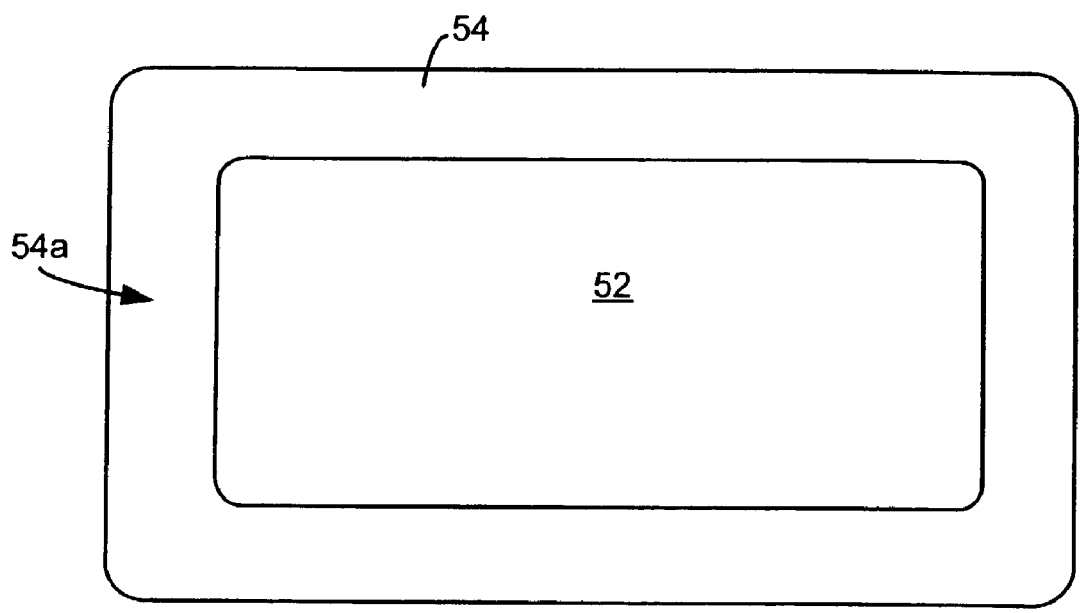
FIG. 2 is a generic diagram of an image screen illustrating an image region and a command region on the display of FIG. 1.

As will be described below, the fire sprinkler drawing program 50 is responsive to user initiated commands in the form of keyboard and mouse commands as well as voice commands. FIG. 2 illustrates the generic form of a possible graphics image that may be placed on the display unit 12 including an image or drawing region 52 and a command region 54. The image region 52 is the region in which the fire sprinkler system drawing and, if desired, the building in which the fire sprinkler system being drawn, is illustrated in graphical form. The building and the fire sprinkler system can be drawn in any form, such a in two-dimensional form, three-dimensional form, etc. In this case, each part of the drawing, such as each building wall, floor, ceiling, pipe, fitting, coupling, etc. is a separate object which is instantiated to have some particular qualities or parameters as well as a particular location in some coordinate space. The user can add or delete elements from the drawing on the image region 52 as desired using appropriate commands.

Generally speaking, the command region 54, provides or displays commands that can be used to draw a fire sprinkler system and a building in which this system is to be used. Such commands typically take the form of pull down menus having numerous commands that can be selected by the user with, for example, the mouse 22 or the keyboard 24 (via, for example, function keys) to perform certain tasks within the image region 52. The command region 54 may also include a section 54*a* that displays templates or other drawing commands that can be used to place, delete or modify objects within the image region. These commands may cause the curser to draw, for example, a wall, a ceiling, a pipe, a fitting, etc. when the command is selected and the cursor is placed in the image region 52. When a user selects one of these commands and draws an element in the image region, the program 50 will instantiate the element as an object within the fire sprinkler system drawing, as stored in the database 16.

Figure 3:
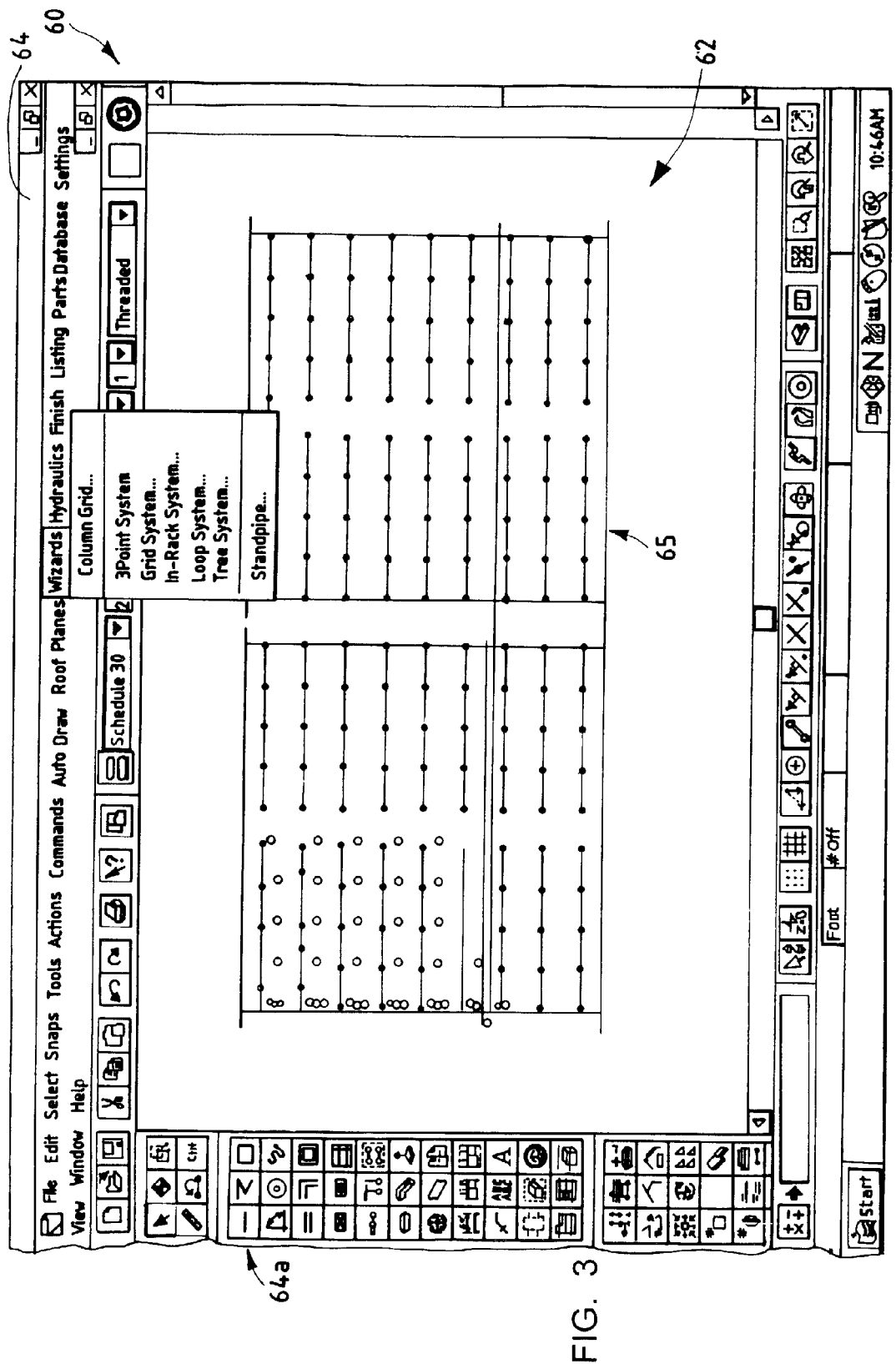
FIG. 3 is an example screen illustrating a fire sprinkler drawing system display having a command region with numerous commands therein and an image region.

FIG. 3 provides an example of an image 60 that may be generated on the display screen 12 having an image region 62 and a command region 64 in the form of that illustrated in FIG. 2. As shown in FIG. 3, a fire sprinkler system drawing 65 having interconnected sprinkler heads, branch lines, cross mains, etc. is displayed in the image region 62. Furthermore, the left hand side of the command region 64*a* of FIG. 3 includes a set of templates or drawing commands that can be used to place objects on the image region 62. There are also numerous commands available in the form of pull down menus on the top portion of the command region 64. In particular, these commands may be accessed via pull down menus entitled File, Edit, Select, Snaps, Tools, Actions, Commands, Auto Draw, Roof Planes, Wizards, Hydraulics, Finish, Listing, Parts Database, Settings, etc. In FIG. 3, the Wizards pull down menu is selected illustrating a 3 Point System command, a Grid System command, an In-Rack System command, a Loop System command and a Tree System command. When any of these wizards commands is selected, a wizard or routine within the program 50 in initiated which aids the user in drawing the particular type of fire sprinkler system, such as a grid fire sprinkler system, a loop fire sprinkler system, etc. Thus, as illustrated in FIG. 3, each of the pull down menus in the command region 64 may be selected to illustrate or access commands that can be used to perform functions within the image region 62.

As will be understood, some of the commands, such as the 3 Point System command, runs a routine that asks the user for additional information. In particular, the 3 Point System wizard is a routine that first asks the user to select and area on the image region 62 in which a sprinkler system is to be drawn, and then asks the user for hundreds of other design criteria to be used in drawing a fire sprinkler system. After the user enters all of the design criteria, the 3-point wizard then draws a fire sprinkler system within the designated area as specified by the design criteria entered by the user. Thus, certain commands, when selected, will cause the user to use other commands to, for example, input particular information which is needed to implement a function or operation within the image region 62.

It can be seen that there are many, many commands that are available to the user of the drawing system, and, at least, initially, the user can be overwhelmed with the sheer number of commands that he or she can initiate at any given time. Thus, the user may be unable to easily and quickly find the command that he or she needs at a particular time. To help alleviate this problem, the fire sprinkler drawing system 10 of FIG. 1 incorporates a voice command acquisition and recognition feature to enable a user to more quickly and easily draw a fire sprinkler system using voice commands.

As illustrated in FIG. 1, the voice recognition unit 42 is stored in the processing unit 14 and is executed on the processor associated therewith to process incoming voice signals generated by the microphone 24. During this processing activity, a voice signal is processed to determine a voice command, which is then compared to a list of appropriate or possible commands for the situation or context. Thus, in some contexts, a command may not be appropriate or available because of the state in which the program 50 lies and, if so, an error signal or other message may be displayed to the user to indicate that the voice command is inappropriate. In any event, if the decoded voice signal is determined to be, according to some statistical measure, one of the possible or currently appropriate commands, that command is sent to the processor to be processed within the context of the fire sprinkler drawing program 50 in a manner similar to the manner in which a mouse or keyboard generated command would be processed.

More particularly, when the voice processing unit 42 receives speech, voice or other sound signals from the microphone 24, the voice processing unit 42 performs voice or speech recognition processing thereon in any known or desired manner and delivers a potential command to the controller unit 44 based on recognized voice inputs which is then delivered to the program 50 in the same manner that decoded keyboard and mouse commands are delivered to the program 50. Of course, the voice processing unit 42 may deliver a decoded command to the program directly if so desired. The voice processing unit 42 may perform any desired or known type of processing on the received speech signals to identify certain recognized speech commands or words. During this process, the voice processing unit 42 may compare an identified voice command to a list of stored or recognized commands which may be stored in a memory 70 to determine if a valid command is being delivered via the voice or speech input. Of course, if desired, the controller 42 may determine if the received command is a valid command within the context of the program 50 and may notify the user when an unrecognized command is received. The voice processing unit 42 may, if so desired, have learning capabilities of any desired type.

Figure 4:
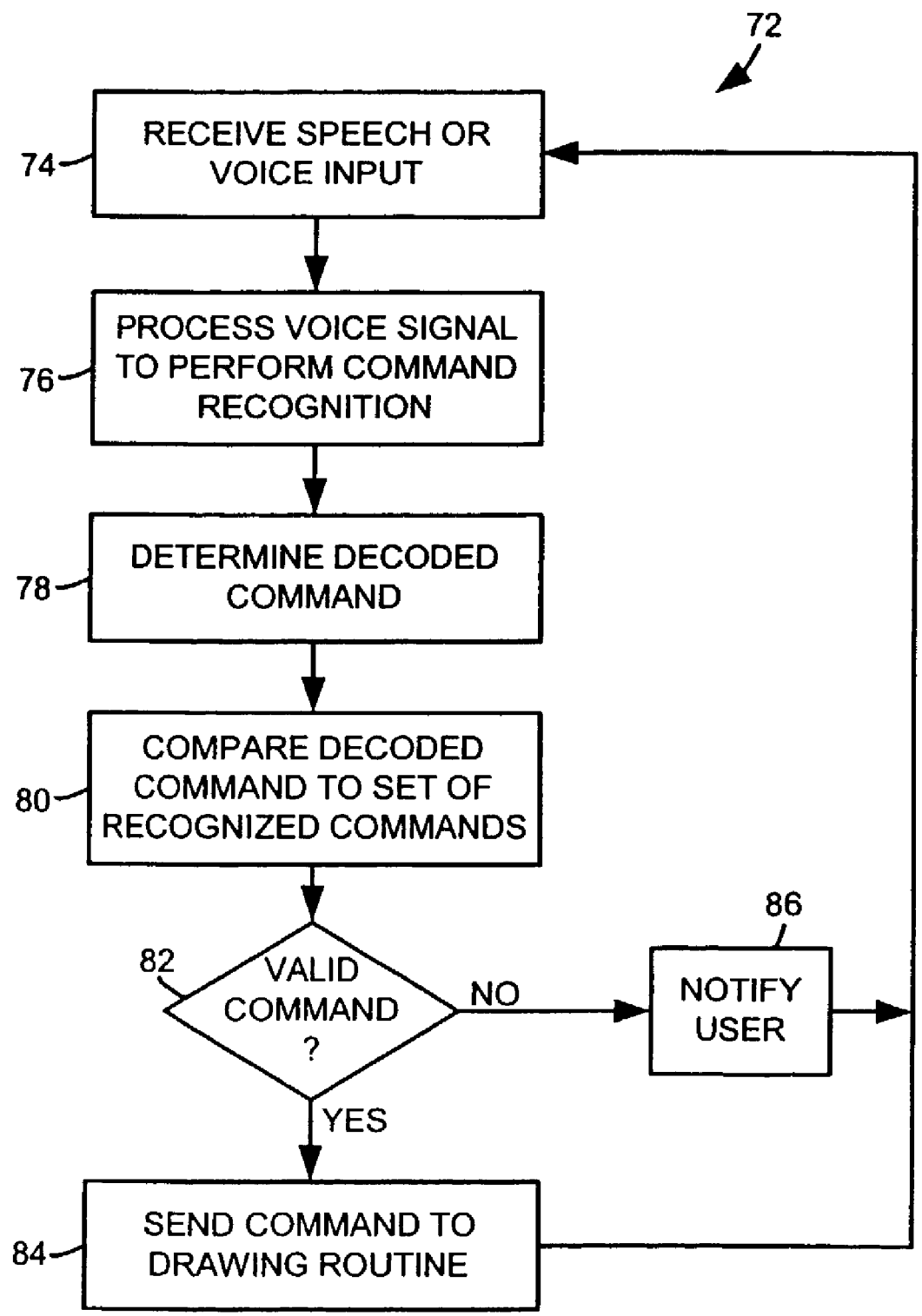
FIG. 4 is a flow chart of software which may be used to implement the voice activated commands within the fire sprinkler drawing system of FIG. 1.

Referring now to FIG. 4, a flowchart 72 depicts the operation of one embodiment of software associated with an embodiment of the voice processing unit 42 that may be used to implement voice activated commands within the fire sprinkler drawing system or program 50. It should be noted that the flowchart 72 is general in nature and can be implemented using any desired programming structure, routines or commands. In the flowchart 72, a block 74 receives a speech or voice signal from the microphone 24 or other voice input device. A block 76 processes the voice signal to identify a voice command within the signal using any desired or standard voice recognition processing routine, such as that indicated above. A block 78 next determines a potential decoded command and a block 80 compares the identified decoded command or input with a set of recognized commands stored in, for example, the memory 70, to determine if the decoded command is a valid command. Of course, the set of recognized commands may change depending on the state of the program 50 at any particular time. If the voice command is recognized as being the same or similar to one of the recognized commands as determined by the block 82, a block 84 provides the command to the fire sprinkler drawing program 50 via, for example, the controller 44, and control is returned to the block 74. The command is then used by the fire sprinkler drawing program 50 in the manner in which it would be used if received via a keyboard or mouse input. If, at the block 82, the voice command signal is not recognized as a valid command, a block 86 may notify the user via, for example, a screen prompt or a voice or sound indication, such as a beep, and control is returned to the block 74 which receives and processes further voice signals. If desired, however, the program 50 may implement a check to determine if a decoded voice command is a valid command and may ignore invalid commands. Thus, the blocks of the flowchart 72 do not need to be all within the voice processing unit 42.

Generally speaking, the voice processing unit 42 may implement or allow a user to perform using spoken command any number or type of commands including, for example, drawing placement commands, wizard initiation commands, AutoDraw commands, Edit commands, View commands, Parts Listing commands, Hydraulics calculation commands, Software Management commands, and Help commands, to name but a few.

Generally speaking, Drawing Placement commands enable the user to place specific building, pipe and sprinkler elements, such as pipes, hangers, columns, sprinkler heads, mains, etc. into the image area of a drawing or layout being designed by the user. Wizard Initiation commands enable the user to initiate a wizard that asks for exact specifications of a variety of elements and that then uses these specifications to draw a fire sprinkler system within the image area. AutoDraw commands allow the user to have the computer perform particular drawing functions, such as placing fittings, hangers, etc. within a fire sprinkler system being drawn. Edit commands enable the user to modify and manipulate existing elements in a drawing and includes commands such as copy, paste, delete, rotate, mirror, etc. View commands determine, change or manipulate the size, contour and color of a drawing displayed by the computer in the image region. These commands includes zoom, 3-D/2-D, element colors, distance between points, etc. Parts Listing commands enable the user to view, in list format, the sprinkler and pipe elements used in a drawing within the image region. These commands may allow the user to view elements according to different categories such as cost, pipe size, manufacturer, etc. Hydraulics calculation commands initiate routines that perform different types of known hydraulic calculations which enable the user to examine the hydraulic performance of a fire sprinkler system depicted in the fire sprinkler system drawing. These commands include defining a remote area, creating analysis reports, etc. Software Management commands allows the user to store and retrieve various files and program specifications and includes such commands as save, print, adding parts to database, changing default settings, etc. Help commands allow the user to access a database of information describing the software's features and capabilities and may include accessing tutorial videos, daily tips which are tips given to the user pertaining to the operation of the fire sprinkler drawing program 50, etc.

The table below lists one set of commands that may be recognized by the voice processing unit 42 and stored in the memory 70, along with a description of the function performed by each command within the fire sprinkler drawing program 50

| Command | Description |
|---|---|
| Properties | Show properties of selected element. |
| Valve | Place valve (in image area). |
| Bushing | Place bushing (in image area). |
| Coupling | Place coupling (in image area). |
| Cross | Place cross (in image area). |
| Tee | Place tee (in image area). |
| Elbow | Place elbow (in image area). |
| Single 2d dimension | Dimension in level plane. |
| Single dimension | Show a single dimension. |
| Star dimension | Determine elevation distances. |
| Dimension 2d continuous | Show element or image in continuous second dimension plane. |
| Dimension area | Select or specify dimension area. |
| Rectangular crossing | Select all elements touching and within the selection rectangle. |
| Continuous crossing | Select all elements touching line. |
| Snaps | Connect elements together. |
| Match elevation | Place selected elements at the same elevation in drawing. |
| Toggle control | Toggle voice control off/on. |
| Scale | Change size of an element. |
| Text box | Create a text box. |
| Text line | Create a text line. |
| Leader line | Create a leader line. |
| Get defaults from selection | Get defaults of selected elements. |
| Toggle pipe labels | Switch pipe labels on or off. |
| Drawing settings | Show or select drawing settings |
| Pipe styles | Show available pipe styles on image. |
| Fabrication standards | Show fabrication standards on image. |
| Clean up intersections | Perform clean up functions on intersections including drawing the elements properly on the screen and performing connections properly at the intersections. |
| Harmonize pipes and fittings | Perform harmonization function on pipes and fittings to make sure the pipes and fitting connect properly to the extent possible. |
| Remote area | Define a remote area in the fire sprinkler system for hydraulic calculations. |
| Keep most demanding area | Delete all remote areas except the most hydraulically demanding remote area. |
| Renumber node tags | Renumber the node tags in the drawing. |
| Update node tags | Update the node tags in the drawing. |
| Analysis reports | Perform and print or display analysis reports. |
| Auto peak | Determine most hydraulically demanding area of the system drawn. |
| System optimizer | Initiate system optimizer routine which performs hydraulic checks and calculations on the fire sprinkler system and allows a user to hydraulically optimize the fire sprinkler system. |
| Column wizard | Initiate wizard or routine that draws building columns. |
| Tree wizard | Initiate wizard or routine that draws a tree type fire sprinkler system. |
| Grid wizard | Initiate wizard or routine that draws a grid type fire sprinkler system. |
| Elevate elements | Elevate selected elements in the drawing to pipes. |
| Automatic roof planes | Automatically place roof planes in the drawing to columns or walls. |
| Multiple swing | Make a swing joint connecting all selected pipes. |
| Swing joint | Make a swing joint connection between two pipes. |
| Sprinklers to pipes | Connect sprinklers to pipes. |
| Target pipes | Draw a pipe from all selected pipes to a specified target pipe. |
| Route pipe | Start the route a pipe command to perform numerous piping functions at one time. |
| Fittings auto | Place fittings as needed to the selected elements in the drawing. |
| Hangers auto | Place hangers on the selected elements in the drawing. |
| Size pipes | Initiate function to size pipes to user selected values. |
| Easy drop | Place couplings or extend drop nipples to sprinklers. |

-continued

| Command | Description |
|---|---|
| Auto couplings | Place couplings in the drawing as instructed. |
| Auto branch lines | Connect selected sprinklers with branch lines. |
| Ceiling grid | Place ceiling grid in the drawing. |
| Break pipes | Break selected pipe or pipes apart. |
| Trim extend | Extend selected element. |
| Stretch lines | Extend line in specified manner. |
| Occupancy area | Create an occupancy area. |
| Hide area | Hide piping in the drawing. |
| System area | Separate system areas from one another. |
| Beam single | Place a single beam in the drawing. |
| Beam continuous | Place a continuous beam in the drawing. |
| Window opening | Place a window opening in the drawing. |
| Round opening | Place a round opening in the drawing. |
| Door opening | Place a door opening in the drawing. |
| Sprinkler | Place a sprinkler in the drawing. |
| Continuous pipe | Place a continuous pipe in the drawing in manner specified by the user. |
| Pipe | Place a pipe in the drawing. |
| Xref | Place an externally referenced drawing in another drawing. |
| Picture | Place a bitmap or jpeg in a drawing. |
| Select all like selected | Select all objects like the selected object in the drawing. |
| Select every sprinkler component | Select all sprinkler components in the drawing. |
| Line crossing | Selects all elements touching line. |
| Select every hanger | Select all hangers in the drawing. |
| Window select hangers | Select all hangers in a defined window. |
| Window select cross | Select all crosses in a defined window. |
| Window select tees | Select all tees within a defined window. |
| Window select elbows | Select all elbows within a defined window. |
| Window select fittings | Select all fittings within a defined window. |
| Window select branch lines | Select all branch lines within a defined window. |
| Window select cross mains | Select all cross mains within a defined window. |
| Window select pipes | Select all pipes within a defined window. |
| Select every cross main | Select every cross main within the drawing. |
| Select every branch line | Select every branch line within the drawing. |
| Select every pipe | Select every pipe within the drawing. |
| Paste bitmap | Paste bitmap file onto drawing. |
| Copy bitmap | Copy bitmap file. |
| Print hydraulic report | Print hydraulic report to a specified printer. |
| Delete | Delete selected item. |
| Undo | Undo previous command. |
| Redo | Redo previous undone command. |
| Select last | Select the last item or group of items selected. |
| Open | Open a file. |
| Split | Split a group. |
| Wall | Place a wall within the drawing. |
| Wall rectangle | Place a rectangular wall within the drawing. |

Of course these commands are but of few of the voice commands that can be used in a fire sprinkler drawing system to provide a user with more accurate and faster drawing capabilities. Thus, any other commands could be used instead of or in addition to those listed above. In fact, in some instances, a single voice command can eliminate the need to perform two or more mouse or keyboard selection operations, thereby making these commands more readily available and easier to use. In particular, in some instances, the user has to use a mouse to select a pull down menu and then move the mouse to a command and then select that command, all of which takes time and hand coordination. However, that same command may be initiated by a single voice command in a fraction of the time and with a fraction of the effort. Still further, it has been determined that, in the complex drawing environment of fire sprinkler systems, it is often easier for the user to remember the names of the commands he or she needs to use than the location or place at which the user needs to access that command from the windows menu. This fact is especially true when the designer or user is unfamiliar with the fire sprinkler drawing program such as when he or she is first learning to use the system. Thus, the incorporation of the voice activated commands within the fire sprinkler drawing environment is especially beneficial as it reduces the time it takes a user to draw a fire sprinkler system as well as the time it takes the user or designer to learn to use the fire sprinkler drawing program effectively.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A fire sprinkler drawing system, comprising:
a processor;
a memory coupled to the processor;
a display device coupled to the processor;
a drawing routine stored in the memory and adapted to be executed on the processor to produce a fire sprinkler system drawing of two or more interconnected fire sprinkler elements in response to a plurality of user initiated commands, wherein said drawing routine stores the fire sprinkler drawing in the memory and is adapted to display the fire sprinkler drawing on the display device; and
a voice processing unit stored on the memory and adapted to be executed on the processor to receive sound signals, to process the sound signals to generate a decoded command and to deliver the decoded command as one of the user initiated commands to the drawing routine for use in producing the fire sprinkler system drawing if the decoded command is an appropriate command for a current context of the drawing routine.

2. The fire sprinkler drawing system of claim 1, wherein the drawing routine is an object oriented routine that operates using an object oriented programming paradigm.

3. The fire sprinkler drawing system of claim 1, wherein the drawing routine is a computer aided drawing routine.

4. The fire sprinkler drawing system of claim 1, further including a set of recognized commands stored in the memory and wherein the voice processing unit is adapted to compare the decoded command to one or more of the recognized commands to determine if the decoded command is a valid command.

5. The fire sprinkler drawing system of claim 4, wherein the voice processing unit is adapted to fail to deliver the decoded command to the drawing routine if the decoded command does not match any of the set of the recognized commands.

6. The fire sprinkler drawing system of claim 1, wherein the voice processing unit is adapted to decode a drawing placement command that enables a user to place a building or a sprinkler system element into the fire sprinkler system drawing as displayed on the display device.

7. The fire sprinkler drawing system of claim 1, wherein the voice processing unit is adapted to decode a wizard initiation command that initiates a wizard routine that draws two or more interconnected fire sprinkler system elements within the fire sprinkler system drawing as displayed on the display device.

8. The fire sprinkler drawing system of claim 1, wherein the voice processing unit is adapted to decode an autodraw command that causes the drawing program to perform a drawing function related to placing a fire sprinkler system element within the fire sprinkler system drawing as displayed on the display device.

9. The fire sprinkler drawing system of claim 8, wherein the voice processing unit is adapted to decode an autodraw command comprising a command that places two or more fittings in the fire sprinkler system drawing.

10. The fire sprinkler drawing system of claim 8, wherein the voice processing unit is adapted to decode an autodraw command comprising a command that places sprinkler system hangers in the fire sprinkler system drawing.

11. The fire sprinkler drawing system of claim 1, wherein the voice processing unit is adapted to decode an edit command that enables the user to manipulate existing sprinkler system elements in the fire sprinkler system drawing.

12. The fire sprinkler drawing system of claim 1, wherein the voice processing unit is adapted to decode a view command that determines, changes or manipulates the size, contour or color of a fire sprinkler system element within the fire sprinkler system drawing.

13. The fire sprinkler drawing system of claim 12, wherein the voice processing unit is adapted to decode a view command that causes the drawing routine to display a fire sprinkler system element on the display device in three dimensions.

14. The fire sprinkler drawing system of claim 1, wherein the voice processing unit is adapted to decode a parts listing command that causes the drawing routine to display a list of one or more sprinkler system elements used within the fire sprinkler system drawing.

15. The fire sprinkler drawing system of claim 1, wherein the voice processing unit is adapted to decode a hydraulics calculation command adapted to cause the drawing routine to perform a hydraulic calculation with respect to the fire sprinkler system embodied in the fire sprinkler system drawing.

16. The fire sprinkler drawing system of claim 15, wherein the voice processing unit is adapted to decode a hydraulics calculation command that defines a remote area within the dire sprinkler system drawing.

17. The fire sprinkler drawing system of claim 15, wherein the voice processing unit is adapted to decode a hydraulics calculation command that performs a hydraulic analysis with respect to the fire sprinkler system embodied in the fire sprinkler system drawing.

18. The fire sprinkler drawing system of claim 1, wherein the voice processing unit is adapted to decode a software management command adapted to perform a file manipulation activity.

19. The fire sprinkler drawing system of claim 1, further including a database of information describing features and capabilities of the drawing routine stored on the memory and wherein the voice processing unit is adapted to decode a help command that provides the user access to the database of information describing features and capabilities of the drawing routine.

20. The fire sprinkler drawing system of claim 1, further including a microphone communicatively coupled to the voice processing unit.

21. The fire sprinkler drawing system of claim 1, further including a database of information describing features and capabilities of the drawing routine stored on the memory and wherein the voice processing unit is adapted to decode a help command that provides the user access to the database of information describing features and capabilities of the drawing routine.

22. A fire sprinkler drawing system for use on a computer having a processor, a display device, a voice input device, and a computer memory, the fire sprinkler drawing system, comprising:
   a memory;
   a drawing routine stored on the memory and adapted to be executed on the processor to produce a fire sprinkler system drawing of two or more interconnected fire sprinkler elements in response to a plurality of user initiated commands, wherein said drawing routine is adapted to store the fire sprinkler drawing in the computer memory and is adapted to display the fire sprinkler drawing on the display device; and
   a voice processing unit stored on the memory and adapted to be executed on the processor to receive sound signals from the voice input device, to process the sound signals to generate a decoded command and to deliver the decoded command as one of the user initiated commands to the drawing routine for use in producing the fire sprinkler system drawing if the decoded command is an appropriate command for a current context of the drawing routine.

23. The fire sprinkler drawing system of claim 22, wherein the drawing routine is an object oriented routine that operates using an object oriented programming paradigm.

24. The fire sprinkler drawing system of claim 22, wherein the drawing routine is a computer aided drawing routine.

25. The fire sprinkler drawing system of claim 22, further including a set of recognized commands stored in the memory and wherein the voice processing unit is adapted to compare the decoded command to one or more of the recognized commands to determine if the decoded command is a valid command.

26. The fire sprinkler drawing system of claim 25, wherein the voice processing unit is adapted to fail to deliver the decoded command to the drawing routine if the decoded command does not match any of the set of the recognized commands.

27. The fire sprinkler drawing system of claim 22, wherein the voice processing unit is adapted to decode a drawing placement command that enables a user to place a building or a sprinkler system element into the fire sprinkler system drawing as displayed on the display device.

28. The fire sprinkler drawing system of claim 22, wherein the voice processing unit is adapted to decode a wizard initiation command that initiates a wizard routine that draws two or more interconnected fire sprinkler system elements within the fire sprinkler system drawing as displayed on the display device.

29. The fire sprinkler drawing system of claim 22, wherein the voice processing unit is adapted to decode an autodraw command that causes the drawing program to perform a drawing function related to placing a fire sprinkler system element within the fire sprinkler system drawing as displayed on the display device.

30. The fire sprinkler drawing system of claim 29, wherein the voice processing unit is adapted to decode ail autodraw command comprising a command that places two or more fittings in the fire sprinkler system drawing.

31. The fire sprinkler drawing system of claim 29, wherein the voice processing unit is adapted to decode an autodraw command comprising a command that places sprinkler system hangers in the fire sprinkler system drawing.

32. The fire sprinkler drawing system of claim 22, wherein the voice processing unit is adapted to decode an edit command that enables the user to manipulate existing sprinkler system elements in the fire sprinkler system drawing.

33. The fire sprinkler drawing system of claim 22, wherein the voice processing unit is adapted to decode a view command that determines, changes or manipulates the size, contour or color of a fire sprinkler system element within the fire sprinkler system drawing.

34. The fire sprinkler drawing system of claim 33, wherein the voice processing unit is adapted to decode a view command that causes the drawing routine to display a fire sprinkler system element on the display device in three dimensions.

35. The fire sprinkler drawing system of claim 22, wherein the voice processing unit is adapted to decode a parts listing command that causes the drawing routine to display a list of one or more sprinkler system elements used within the fire sprinkler system drawing.

36. The fire sprinkler drawing system of claim 22, wherein the voice processing unit is adapted to decode a hydraulics calculation command adapted to cause the drawing routine to perform a hydraulic calculation with respect to the fire sprinkler system embodied in the fire sprinkler system drawing.

37. The fire sprinkler drawing system of claim 36, wherein the voice processing unit is adapted to decode a hydraulics calculation command that defines a remote area within the fire sprinkler system drawing.

38. The fire sprinkler drawing system of claim 36, wherein the voice processing unit is adapted to decode a hydraulics calculation command that performs a hydraulic analysis with respect to the fire sprinkler system embodied in the fire sprinkler system drawing.

39. The fire sprinkler drawing system of claim 22, wherein the voice processing unit is adapted to decode a software management command adapted to perform a file manipulation activity.

40. A building construction drawing system, comprising:
   a processor;
   a memory coupled to the processor;
   a display device coupled to the processor;
   a drawing routine stored in the memory and adapted to he executed on the processor to produce a building construction system drawing of two or more interconnected building construction elements in response to a plurality of user initiated commands, wherein said drawing routine stores the building construction system drawing in the memory and is adapted to display the building construction system drawing on the display device; and
   a voice processing unit stored on the memory and adapted to be executed on the processor to receive sound signals, to process the sound signals to generate a decoded command and to deliver the decoded command as one of the user initiated commands to the drawing routine for use in producing the building construction system drawing if the decoded command is an appropriate command for a current context of the drawing routine.

41. The building construction drawing system of claim 40, wherein the drawing routine is an object oriented routine that operates using an object oriented programming paradigm.

42. The building construction drawing system of claim 40, wherein the drawing routine is a computer aided drawing routine.

43. The building construction drawing system of claim 40, further including a set of recognized commands stored in the memory and wherein the voice processing unit is adapted to compare the decoded command to one or more of the recognized commands to determine if the decoded command is a valid command.

44. The building construction drawing system of claim 40, wherein the voice processing unit is adapted to decode a drawing placement command that enables a user to place a building construction system element into the building construction system drawing as displayed on the display device.

45. The building construction drawing system of claim 40, wherein the voice processing unit is adapted to decode a wizard initiation command that initiates a wizard routine that draws two or more interconnected building construction system elements within the building construction system drawing as displayed on the display device.

46. The building construction drawing system of claim 40, wherein the voice processing unit is adapted to decode an edit command that enables the user to manipulate existing building construction system elements in the building construction system drawing.

47. The building construction drawing system of claim 40, wherein the voice processing unit is adapted to decode a view command that determines, changes or manipulates the size, contour or color of a building construction system element within the building construction system drawing.

48. The building construction drawing system of claim 40, wherein the voice processing unit is adapted to decode a parts listing command that causes the drawing routine to display a list of one or more building construction system elements used within the building construction system drawing.

49. The building construction drawing system of claim 40, further including a database of information describing features and capabilities of the drawing routine stored on the memory and wherein the voice processing unit is adapted to decode a help command that provides the user access to the database of information describing features and capabilities of the drawing routine.

* * * * *